United States Patent [19]

Kressner et al.

[11] 4,332,587
[45] Jun. 1, 1982

[54] COLORANT PREPARATIONS, A PROCESS FOR THEIR PRODUCTION AND THEIR USE FOR COLORING PLASTICS

[75] Inventors: Michael Kressner, Leichlingen; Joachim Kolbe, Leverkusen; Fritz Bremer, Leverkusen; Georg Pape, Leverkusen; Karlheinz Wolf, Leverkusen; Ferdinand Kümmeler, Leverkusen, all of Fed. Rep. of Germany

[73] Assignee: Bayer Aktiengesellschaft, Leverkusen, Fed. Rep. of Germany

[21] Appl. No.: 229,049

[22] Filed: Jan. 28, 1981

[30] Foreign Application Priority Data

Feb. 16, 1980 [DE] Fed. Rep. of Germany ....... 3005908

[51] Int. Cl.³ .................... D06P 3/00; D06P 3/79; C08K 5/10; C08J 3/20
[52] U.S. Cl. ............................................ 8/506; 8/507; 8/508; 8/510; 8/512; 8/513; 8/514; 8/515; 106/27; 106/28; 106/260; 106/308 F; 106/308 Q; 106/308 M
[58] Field of Search ............... 106/266, 27, 28, 308 M, 106/308 F, 308 Q; 8/508, 513, 907, 515, 506, 512, 514, 510

[56] References Cited

U.S. PATENT DOCUMENTS

| | | | |
|---|---|---|---|
| 3,736,096 | 5/1973 | Nichols et al. | 8/907 |
| 3,956,008 | 5/1976 | Knepper et al. | 106/308 Q |
| 3,960,486 | 6/1976 | Daubach et al. | 8/907 |
| 4,020,040 | 4/1977 | Kattoh et al. | 260/42.56 |
| 4,040,996 | 8/1977 | Van Vonno | 260/23 XA |
| 4,040,997 | 8/1977 | Van Vonno et al. | 260/23 XA |
| 4,089,699 | 5/1978 | Blackburn et al. | 106/308 M |

FOREIGN PATENT DOCUMENTS 76434 9/1971 Belgium ..................... 106/308 Q

*Primary Examiner*—Herbert J. Lilling
*Attorney, Agent, or Firm*—Sprung, Horn, Kramer & Woods

[57] ABSTRACT

A colorant preparation containing
 (A) a colorant which is sparingly soluble or insoluble in water,
 (B) a plasticizer based on an ester and
 (C) a reaction product of a fatty acid ester of a polyhydric alcohol and ethylene oxide, a process for the production of this preparation and its use for pigmenting plastics.

10 Claims, No Drawings

COLORANT PREPARATIONS, A PROCESS FOR THEIR PRODUCTION AND THEIR USE FOR COLORING PLASTICS

The present invention relates to preparations of colorants which are sparingly soluble or insoluble in water, a process for their production and their use for colouring plastics, in particular thermoplastics.

The new preparations contain (A) a colorant which is sparingly soluble or insoluble in water,
(B) a plasticizer based on an ester and
(C) a reaction product of a fatty acid ester of a polyhydric alcohol and ethylene oxide.

The new preparations are preferably in the form of dispersions which contain, relative to the total weight of components A, B and C, 5–70% by weight, particularly preferably 10–60% by weight, of A, 30–95% by weight, particularly preferably 40–90% by weight, of B and 0.1–10% by weight, particularly preferably 0.5–5% by weight, of C. The viscosity of the preparations is preferably between about 1,000 and about 2,000 mPa.s.

Disperse dyestuffs and, preferably, pigments are employed as the colorants in the preparations.

Suitable organic pigments are, for example, those of the azo, anthraquinone, azaporphin, thioindigo or polycyclic series; and also of the quinacridone, dioxazine, naphthalenetetracarboxylic acid or perylenetetracarboxylic acid series, as well as dyestuff lakes, such as Ca, Mg and Al lakes of dyestuffs containing sulphonic acid groups and/or carboxylic acid groups.

Suitable inorganic pigments are, for example, zinc sulphides, cadmium sulphides/selenides, ultramarine, titanium dioxides, iron oxides, nickel titanium yellow or chromium titanium yellow, cobalt blue, chromium oxides and chromate pigments. Carbon black can also be used in the new preparations.

The plasticisers on an ester basis which are employed in the preparations according to the invention are those which are usually employed in the processing of plastics. Examples which may be mentioned are: adipates, phosphates, such as tricresyl phosphate, phthalates, such as dibutyl phthalate and dioctyl phthalate, sulphonates and polymeric plasticisers of polyfunctional carboxylic acids and polyalcohols. Diisooctyl adipate is preferably used.

The fatty acid esters on which the reaction products of fatty acid esters of polyhydric alcohols and ethylene oxide which are to be employed according to the invention are based, can be either of natural origin or of synthetic origin.

The alcohol component preferably has 3–6 OH groups and 3–6 C atoms. Examples which may be mentioned are: glycerol, trimethylolpropane, pentaerythritol and sugar-alcohols, such as sorbitol, mannitol and dulcitol. The polyhydric alcohols can be either partially esterified or completely esterified.

Fatty acids which are of interest in the context of this invention are, in particular, saturated and unsaturated monocarboxylic acids with up to about 18 C atoms.

Examples which may be mentioned of fatty acid esters of polyfunctional alcohols are: glycerol esters, such as glycerol mono-, di- and tri-stearate, glycerol mono-, di and tri-oleate and glycerol mono-, di- and tri-ricinoleate.

Reaction products of fats and/or ester-oils and ethylene oxide are preferably employed in the pigment preparations according to the invention. Examples of fats and oils on which these reaction products are based are: soya bean oil, palm oil, coconut oil, olive oil, groundnut oil, linseed oil, cod-liver oil, beef tallow and lard. Ethoxylated castor oil is particularly preferably used.

The reaction products of fatty acid esters of polyfunctional alcohols and ethylene oxide which can be employed according to the invention preferably have molecular weights of between about 100 and about 2,000 g/mol. They can be obtained, for example, by reacting fatty acid esters with ethylene oxide under alkaline catalysis at about 100° to about 150° C. in a manner such that about 3 to about 25 mols of ethylene oxide are added on per mol of fatty acid ester.

The reaction product of castor oil and ethylene oxide in which about 4 to about 10 mols of ethylene oxide have been added on per mol of castor oil is preferably used.

The preparations according to the invention can also contain customary additives, such as preservatives, additives which regulate the viscosity, such as silicon dioxide, or extenders, such as barium sulphate and chalk.

The new colorant preparations are produced in customary wet comminution units, such as attrition mills, roll mills, dissolvers, rotor-stator mills, corundum disc mills, ball mills and high-speed stirred mills which have peripheral velocities of 5–60 m/second, preferably 10–20 m/second, and contain steel, glass, ceramic, sand or plastic grinding bodies about 0.1–10 mm, preferably 0.5–1.2 mm, in diameter. Suitable stirred mills are described, for example, in Farbe und Lack 71, pages 275 et seq. and pages 464 et seq., Farbe und Lack 75, pages 953 et seq., and German Auslegeschrift No. 1,230,657.

The colorant preparations are particularly suitable for colouring and pigmenting plastics, in particular thermoplastics. Examples which may be mentioned are: polyvinyl chloride, polyolefines, poly(meth)acrylate, polyurethane resins and polyester resins and, in particular, homopolymers and copolymers of styrene, such as polystyrene and ABS. The preparations are added to the granular plastic in suitable mixing devices and the mixtures thus obtained are further processed to the desired coloured shaped articles with the aid of suitable plastics processing machines, such as injection-moulding machines and extruders.

The new preparations are distinguished by a good compatibility with the plastic substrate to be coloured or pigmented, even at relatively high dosages. They also have good flow properties.

EXAMPLE 1

50 parts of cadmium sulphide pigment are dispersed intensively with 4 parts of a highly disperse silicic acid with a surface area of about 600 m$^2$/g and 13 parts of trioctyl phosphate in a dispersion kneader until the average particle size of the pigment has reached about 1μ. The viscous paste is then diluted with a further 32 parts of trioctyl phosphate and also with 1 part of castor oil, onto which 10 mols of ethylene oxide have been added, to give a paste which is capable of flow.

This paste is mixed with plastics, such as polystyrene, polyolefines, polyvinyl chloride or polymethacrylate, in an end-over-end mixer or turbo mixer. After the mixing operation, the colour paste adheres firmly to the surface of the granules of plastic, so that further processing in an extruder or an injection-moulding machine can take place. Uniformly coloured plastics which are free from specks are obtained.

EXAMPLE 2

60 parts of cadium sulphide/selenide pigment are processed with 2.4 parts of a highly disperse silicic acid with a surface area of about 600 m²/g and 15 parts of tri-n-butyl phosphate as described in Example 1. 22 parts of tri-n-butyl phosphate and 0.6 part of glycerol tri-stearate, onto which 8 mols of ethylene oxide have been added, are then added to the dispersion, in order to produce a paste which is capable of flow.

The resulting paste is particularly suitable for colouring plasticised polyvinyl chloride, especially if this is to be employed in the coated fabrics industry. For this purpose, the further processor is supplied, by the manufacturer of the polyvinyl chloride, with polyvinyl chloride pastes in the customary consistency which is suitable for coating textiles and other fabrics. The colour paste obtained in accordance with the statements of this example is appropriately stirred into the PVC/plasticiser mixture, using a stirrer or manually. The textile fabric or other fabrics can now be coated directly with the coloured PVC mixture thus obtained; the coating produced is free from specks. The plastics mentioned under Example 1 can also be coloured with the above colour paste, the coloured plastics being free from specks.

EXAMPLE 3

18 parts of copper phthalocyanine are processed with 10 parts of diisooctyl phthalate as described in Example 1. After the desired fineness of the pigment has been reached, the dispersion is diluted with 67 parts of diisooctyl phthalate and 5 parts of coconut oil, onto which 7 mols of ethylene oxide have been added, to give a paste which is capable of flow.

The paste thus produced is particularly suitable for colouring unsaturated polyester resins of phthalic acid, maleic acid or adipic acid and glycols. The colouring operation can be carried out using a stirrer or manually, the colour paste being stirred directly into the unsaturated polyester resin. After curing, transparent colorations which are free from specks are produced in this plastic.

EXAMPLE 4

15 parts of carbon black are processed with 15 parts of di-n-butyl phthalate in a dispersion kneader until the agglomerates have dispersed and the average particle size of the carbon black has reached 25 nm. The dispersion is then diluted with 68 parts of di-n-butyl phthalate and 23 parts of glycerol tri-oleate, onto which 6 mols of ethylene oxide have been added, to give a paste which is capable of flow.

This paste is particularly suitable for colouring polystyrene. If the colouring operation is carried out in an end-over-end mixer or turbo mixer, the unpleasant flying soot which usually arises when pulverulent carbon blacks are used is avoided. Furthermore, an additional dispersing agent is not necessary in this operation. The coloured polystyrene sample has a smooth surface which is free from specks.

EXAMPLE 5

70 parts of titanium dioxide are mixed with 27 parts of diisooctyl adipate and 3 parts of castor oil, onto which 4 mols of ethylene oxide have been added, and the mixture is ground on a single-roll or multi-roll mill. The paste, which is capable of flow, is particularly suitable for colouring polyolefines.

The colouring operation can be carried out in an end-over-end mixer or turbo mixer. When the plastic is further processed on extruders or injection-moulding machines, no deposits are observed in the kneading screw, in contrast to the use of dry pigments. Moreover, the pre-coloured granular plastic can be processed by automatic filling devices without difficulties in the conveying of the granules.

EXAMPLE 6

25 parts of the azo pigment which has been prepared by coupling 1 mol of tetrazotised 3,5,3',5'-tetrachlorobenzidine to 2 mols of acetoacetyl m-xylidide are mixed with 70 parts of di-iso-nonyl adipate and 5 parts of glycerol tri-oleate, onto which 5 mols of ethylene oxide have been added, and the mixture is ground on a single-roll or multi-roll mill in 1-2 passes. The paste can also be produced in a ball mill by filling the mill one-third full with this pigment/plasticiser mixture and one-third full with suitable balls.

The resulting paste, which is capable of flow, is particularly suitable for colouring polymethacrylate. If this plastic is obtained in the form of granules, the colouring operation can be carried out in an end-over-end mixer or turbo mixer. If the starting monomer is to be coloured, the colour paste can be stirred into the methylacrylate. After adding suitable catalysts, polymerisation is then carried out. The colorations achieved by the two processes mentioned are still transparent when up to about 0.2% of colour paste is added to the plastic or to the monomeric starting material. When about 0.5% and more of colour paste is added, opaque colorations are produced.

We claim:
1. A colorant preparation comprising:
   (A) a colorant which is sparingly soluble in water in an amount of 5-70% by weight;
   (B) a plasticiser based on an ester in an amount of 30-95% by weight;
   (C) an ethoxylated castor oil in the amount of 0.1-10% by weight, the weights of components (A), (B) and (C) being based upon the total quantity of components (A), (B) and (C).
2. A colorant preparation according to claim 1, wherein said colorant which is sparingly soluble in water is present in an amount of 10-60% by weight, said plasticiser is present in an amount of 40-90% by weight and said ethoxylated castor oil is present in an amount of 0.5-5% by weight.
3. A colorant preparation according to claim 1, wherein said castor oil is one which has been ethoxylated with 4-10 mols of ethylene oxide per mol of castor oil.
4. Preparation according to claim 1, containing a pigment.
5. Preparation according to claim 1, containing an adipate.
6. Preparations according to claim 1, containing the reaction product of ethylene oxide with the ester of a fatty acid with up to 18 C atoms and an alcohol with 3-6 OH groups and 3-6 C atoms, in which 3-25 mols of ethylene oxide have been added on per mol of fatty acid ester.

7. Preparation according to claim 1, containing a reaction product of a fat and/or ester-oil and ethylene oxide.

8. Process for the production of a preparation according to claim 1, characterised in that a colorant which is sparingly soluble or insoluble in water, a plasticiser based on an ester, and a reaction product of a fatty acid ester of a polyhydric alcohol and ethylene oxide are mixed in wet comminution units in a manner known per se.

9. A plastic composition comprising a plastic and the coloring preparation of claim 1.

10. A plastic composition according to claim 9, wherein said plastic is a thermoplastic.

* * * * *